United States Patent
Lurie et al.

(10) Patent No.: US 7,044,128 B2
(45) Date of Patent: May 16, 2006

(54) CPR DEMONSTRATION DEVICE AND METHODS

(75) Inventors: Keith G. Lurie, Minneapolis, MN (US); Michele D. Perpich, Eden Prairie, MN (US); Thomas E. Kramer, Coon Rapids, MN (US)

(73) Assignee: Advanced Circulatory Systems, Inc., Eden Prairie, MN (US)

( * ) Notice: Subject to any disclaimer, the term of this patent is extended or adjusted under 35 U.S.C. 154(b) by 561 days.

(21) Appl. No.: 10/410,229

(22) Filed: Apr. 8, 2003

(65) Prior Publication Data

US 2004/0200473 A1    Oct. 14, 2004

(51) Int. Cl.
*A61M 16/00*    (2006.01)

(52) U.S. Cl. .................... 128/202.28; 434/265
(58) Field of Classification Search ........... 128/202.28, 128/202.29, 203.11; 601/41, 43; 434/265, 434/267
See application file for complete search history.

(56) References Cited

U.S. PATENT DOCUMENTS

| | | | | |
|---|---|---|---|---|
| 2,774,346 A | | 12/1956 | Halliburton ................. 128/29 |
| 2,904,898 A | * | 9/1959 | Marsden ..................... 434/265 |
| 3,009,266 A | * | 11/1961 | Morris ........................ 434/265 |
| 3,049,811 A | * | 8/1962 | Henning ..................... 434/265 |
| 3,068,590 A | * | 12/1962 | Padellford ................... 434/265 |
| 3,191,596 A | | 6/1965 | Bird et al. .................... 128/29 |
| 3,199,225 A | * | 8/1965 | Robertson et al. .......... 434/265 |
| 3,209,469 A | * | 10/1965 | James ......................... 434/265 |
| 3,274,705 A | * | 9/1966 | Breakspear ................. 434/265 |
| 3,276,147 A | * | 10/1966 | Padellford ................... 434/265 |
| 3,562,924 A | * | 2/1971 | Baerman et al. ............ 434/265 |
| 3,562,925 A | * | 2/1971 | Baermann et al. .......... 434/265 |
| 3,568,333 A | * | 3/1971 | Clark .......................... 434/265 |
| 3,662,751 A | | 5/1972 | Barkalow et al. ......... 128/145.8 |
| 3,669,108 A | | 6/1972 | Sundblom et al. ........ 128/145.8 |
| 3,794,043 A | | 2/1974 | McGinnis ................... 128/349 |
| 3,815,606 A | | 6/1974 | Mazal ......................... 128/351 |
| 3,834,383 A | | 9/1974 | Weigl et al. ............. 128/145.8 |
| 3,872,609 A | * | 3/1975 | Smrcka ....................... 434/265 |
| 3,874,093 A | * | 4/1975 | Garbe ......................... 434/265 |
| 3,933,171 A | | 1/1976 | Hay ......................... 137/493.7 |

(Continued)

FOREIGN PATENT DOCUMENTS

CA    668771    8/1963

(Continued)

OTHER PUBLICATIONS

"Ventilators—Theory and Clinical Application," Dupuis, C.V. Mosby Co., St. Louis, MO @ 1986, pp. 447-448, 481, 496, ISBN 081614201.

(Continued)

*Primary Examiner*—Aaron J. Lewis
(74) *Attorney, Agent, or Firm*—Townsend and Townsend and Crew LLP (57) ABSTRACT

A demonstration device comprises a base having a front side, a back side, a respiratory port, a circulation port, a heart port and at least one lung port. The heart port is fluidly connected to the circulation port, and the lung port is fluidly connected to the respiratory port. A compressible member is sealed to the front side of the base to define a chamber over the lung port and the heart port. A lung member is disposed over the lung port, and a heart member is disposed over the heart port. In this way, when the compressible member is compressed and released, the lung member deflates and inflates and the heart member deflates and inflates.

22 Claims, 6 Drawing Sheets

U.S. PATENT DOCUMENTS

| | | | | |
|---|---|---|---|---|
| 4,041,943 A | 8/1977 | Miller | | 128/145.8 |
| 4,077,404 A | 3/1978 | Elam | | 128/145.8 |
| 4,095,590 A * | 6/1978 | Harrigan | | 601/1 |
| 4,166,458 A | 9/1979 | Harrigan | | 128/24 |
| 4,226,233 A | 10/1980 | Kritzer | | 128/205.13 |
| 4,259,951 A | 4/1981 | Chernack et al. | | 128/200.14 |
| 4,298,023 A | 11/1981 | McGinnis | | 137/529 |
| 4,316,458 A | 2/1982 | Hammerton-Fraser | | 128/205.24 |
| 4,320,754 A | 3/1982 | Watson et al. | | |
| 4,331,426 A * | 5/1982 | Sweeney | | 434/265 |
| 4,360,345 A * | 11/1982 | Hon | | 434/262 |
| 4,397,306 A | 8/1983 | Weisfeldt et al. | | |
| 4,446,864 A | 5/1984 | Watson et al. | | 128/207.14 |
| 4,449,526 A | 5/1984 | Elam | | 128/206.21 |
| 4,533,137 A | 8/1985 | Sonne | | 272/99 |
| 4,601,465 A | 7/1986 | Roy | | 272/99 |
| 4,881,527 A | 11/1989 | Lerman | | 128/30.2 |
| 4,984,987 A * | 1/1991 | Brault et al. | | 434/265 |
| 5,050,593 A | 9/1991 | Poon | | 128/204.23 |
| 5,083,559 A * | 1/1992 | Brault et al. | | 128/202.28 |
| 5,109,840 A | 5/1992 | Daleiden | | 128/205.13 |
| 5,163,424 A | 11/1992 | Kohnke | | 128/205.13 |
| 5,193,544 A | 3/1993 | Jaffe | | 128/634 |
| 5,217,006 A | 6/1993 | McCulloch | | |
| 5,235,970 A | 8/1993 | Augustine | | 128/200.26 |
| 5,295,481 A | 3/1994 | Geeham | | 601/63 |
| 5,301,667 A | 4/1994 | McGrail et al. | | 128/205.14 |
| 5,305,743 A | 4/1994 | Brain | | 128/207.15 |
| 5,312,259 A * | 5/1994 | Flynn | | 434/265 |
| 5,355,879 A | 10/1994 | Brain | | 128/207.15 |
| 5,359,998 A | 11/1994 | Lloyd | | 128/203.11 |
| 5,392,774 A | 2/1995 | Sato | | 128/207.15 |
| 5,454,779 A | 10/1995 | Lurie et al. | | 601/43 |
| 5,551,420 A | 9/1996 | Lurie et al. | | 128/205.13 |
| 5,580,255 A * | 12/1996 | Flynn | | 434/265 |
| 5,645,522 A | 7/1997 | Lurie et al. | | 601/34 |
| 5,692,498 A | 12/1997 | Lurie et al. | | 128/205.24 |
| 5,730,122 A | 3/1998 | Lurie | | 128/207.12 |
| 5,885,084 A * | 3/1999 | Pastrick et al. | | 434/265 |
| 6,062,219 A | 5/2000 | Lurie et al. | | 128/205.24 |
| 6,296,490 B1 * | 10/2001 | Bowden | | 434/265 |
| 6,780,017 B1 * | 8/2004 | Pastrick et al. | | 434/265 |

FOREIGN PATENT DOCUMENTS

| | | | |
|---|---|---|---|
| CA | 2077608 | 3/1993 | |
| DE | 24 53 490 | 5/1975 | |
| DE | 43 08 493 A1 * | 9/1994 | |
| EP | 29352 | 5/1981 | 128/207.16 |
| EP | 0 139 363 | 5/1985 | |
| EP | 0 245 142 | 11/1987 | |
| EP | 0 367 285 | 5/1990 | |
| EP | 0 411 714 A1 | 2/1991 | |
| EP | 0 509 773 A1 | 4/1992 | |
| EP | 0 560 440 A1 * | 9/1993 | |
| GB | 1465127 | 2/1977 | |
| GB | 2139099 | 11/1984 | |
| WO | WO90/05518 | 5/1990 | |
| WO | WO 93/02439 * | 2/1993 | |
| WO | WO93/21982 | 11/1993 | |
| WO | WO95/13108 | 5/1995 | |
| WO | WO95/28193 | 10/1995 | |
| WO | WO96/28215 | 9/1996 | |

OTHER PUBLICATIONS

Directions for use Ambu® CardioPump™, pp. 1-8.

Cohen et al. (1992) "Active compression-decompression resuscitation: A novel method of cardiopulmonary resuscitation." *American Heart Journal* 124 (5):1145-1150.

Cohen et al. (1992) "Active Compression-Decompression A New Method of Cardiopulmonary Resuscitation." *JAMA* 267 (21):2916-2923.

Lindner et al (1993) "Effects of Active Compression-Decompression Resuscitation on Myocardial and Cerebral Resuscitation Blood Flow in Pigs." *Circulation* 88 (3):1254-1263.

Lurie et al. (1995) "Regulated to Death: The Matter of Informed Consent for Human Experimentation in Emergency Resuscitation Research." *PACE* 18:1443-1447.

Mushin W.W. et al., "Automatic Ventilation of the Lungs—The Lewis-Leigh Inflating Valve," *Blackwell Scientific*, Oxford, GB, p. 838.

* cited by examiner

CPR DEMONSTRATION DEVICE AND METHODS

CROSS-REFERENCES TO RELATED APPLICATIONS

This application is related to copending U.S. application Ser. No. 09/854,238, filed May 11, 2001, U.S. application Ser. No. 10/119,203, filed Apr. 8, 2002, and U.S. application Ser. No. 10/114,263, filed Aug. 19, 2002, the complete disclosures of which are herein incorporated by reference.

BACKGROUND OF THE INVENTION

This invention relates generally to the field of blood circulation, and in particular to the manner in which blood is circulated when performing certain procedures, such as cardiopulmonary resuscitation or CPR. More specifically, the invention relates to systems and methods for visually demonstrating the effectiveness of certain procedures that are used to enhance blood circulation.

Worldwide, millions of people suffer from cardiovascular ailments. Of these, cardiac arrest is of particular concern. Perhaps the most common procedure associated with cardiac arrest is the performance of CPR. Techniques for performing CPR are generally well known and are described in, for example, U.S. Pat. Nos. 6,062,219; 5,692,498; 5,551,420, the complete disclosures of which are herein incorporated by reference.

One significant factor that influences the effectiveness of CPR is proper training. If a rescuer improperly or poorly performs CPR, the amount of blood circulated through the patient's body may be limited.

BRIEF SUMMARY OF THE INVENTION

The invention provides a visual demonstration of what occurs within the chest cavity when augmenting negative and/or positive pressures within the thoracic cavity, such as when performing CPR. The invention in one embodiment comprises a demonstration device that comprises a base having a front side, a back side, a respiratory port, a circulation port, a heart port and at least one lung port. The heart port is fluidly connected to the circulation port, and the lung port is fluidly connected to the respiratory port. The device also includes a compressible member that is sealed to the front side of the base so as to define a chamber over the lung port and the heart port. A lung member is disposed over the lung port and a heart member is disposed over the heart port. In this way, when the compressible member is compressed, both the lung member and the heart member deflate, and when the compressible member is released both the lung member and the heart member reinflate. Hence, the device may be used to show how blood enters and exits the heart as the chest is compressed and released.

In one particular aspect, the respiratory port may be closed after the compression member has been compressed. In this way, when the compressible member is released, air is prevented from entering into the respiratory port and the lung member remains at least partially deflated while the heart member is permitted to inflate at a faster rate than when the respiratory port is open. In another embodiment, the compressible member can be pushed downward to generate an increase in pressure within the chamber, causing deflation of the lung and heart members, and then pulled upwards with a handle to facilitate active decompression of the compressible member. This will results in the creation of a vacuum within the chamber, relative to atmospheric pressures.

Conveniently, the circulation port may be disposed on the back side of the base. Also, the base may include a frame that permits the circulation port to be spaced apart from a surface upon which the base is configured to rest.

In another aspect, the device may include a pair of lung ports that are covered by the compressible member such that the heart port is disposed between the two lung ports. Conveniently, the lung members and the heart member may be constructed of elastomeric balloons. In a further aspect, the compressible member may comprise a flexible plastic dome.

The demonstration device may also be used in combination with a valve system that comprises a housing having an inlet and an outlet that is capable of being coupled to the respiratory port. The valve system is configured to prevent respiratory gases from entering into the demonstration device through the respiratory port after the compressible member has been compressed and then released.

The valve system may also be configured to permit respiratory gases to exit the respiratory port upon compression of the compressible member. In some cases, the valve system may be configured to permit respiratory gases injected into the inlet to pass into the respiratory port to fill the lung member.

In use, the compressible member may be compressed to force air out of the lung member where it escapes through the respiratory port and to force air out of the heart member where it escapes through the circulation port. In some cases, the respiratory port may be closed after compressing the compressible member. After the compressible member is released, air is permitted to flow back into the heart member through the circulation port while air is prevented from entering into the lung member through the respiratory port. Conveniently, the valve system may be coupled to the respiratory port to prevent air from entering into the lung member after releasing the compressible member.

With the valve system in place, the compressible member may be recompressed. In so doing, air from the lung member is permitted to exit the device through the valve system. Further, air may be injected through the valve system and into the lung member to inflate the lung member.

DETAILED DESCRIPTION OF THE INVENTION

The invention provides for the visual demonstration of what occurs within the chest when performing CPR. To do so, the invention in one embodiment uses inflatable members, such as balloons, that inflate and deflate as various procedures are performed in order to show how internal chest cavity pressures affect blood circulation. The device may be hand-held.

The invention may be used to demonstrate the effectiveness of a wide variety of procedures, including, for example, with traditional CPR, with CPR when a valve system is used to regulate inflow and/or outflow, and the like. The procedures may be similar to any of those described in U.S. Pat. Nos. 6,062,219; 5,692,498; 5,551,420; 6,155,257; 6,312,399; 6,463,327; 6,425,393; 6,459,933 and in copending U.S. application Ser. Nos. 10/224,263, filed Aug. 19, 2002, Ser. No. 10/119,203, filed Apr. 8, 2002, Ser. No. 09/854,238, filed May 11, 2001, and Ser. No. 09/546,252, filed Apr. 10, 2000, Ser. No. 09/966,945, filed Sep. 28, 2001, the complete disclosures of which are herein incorporated by reference.

Figure 1:
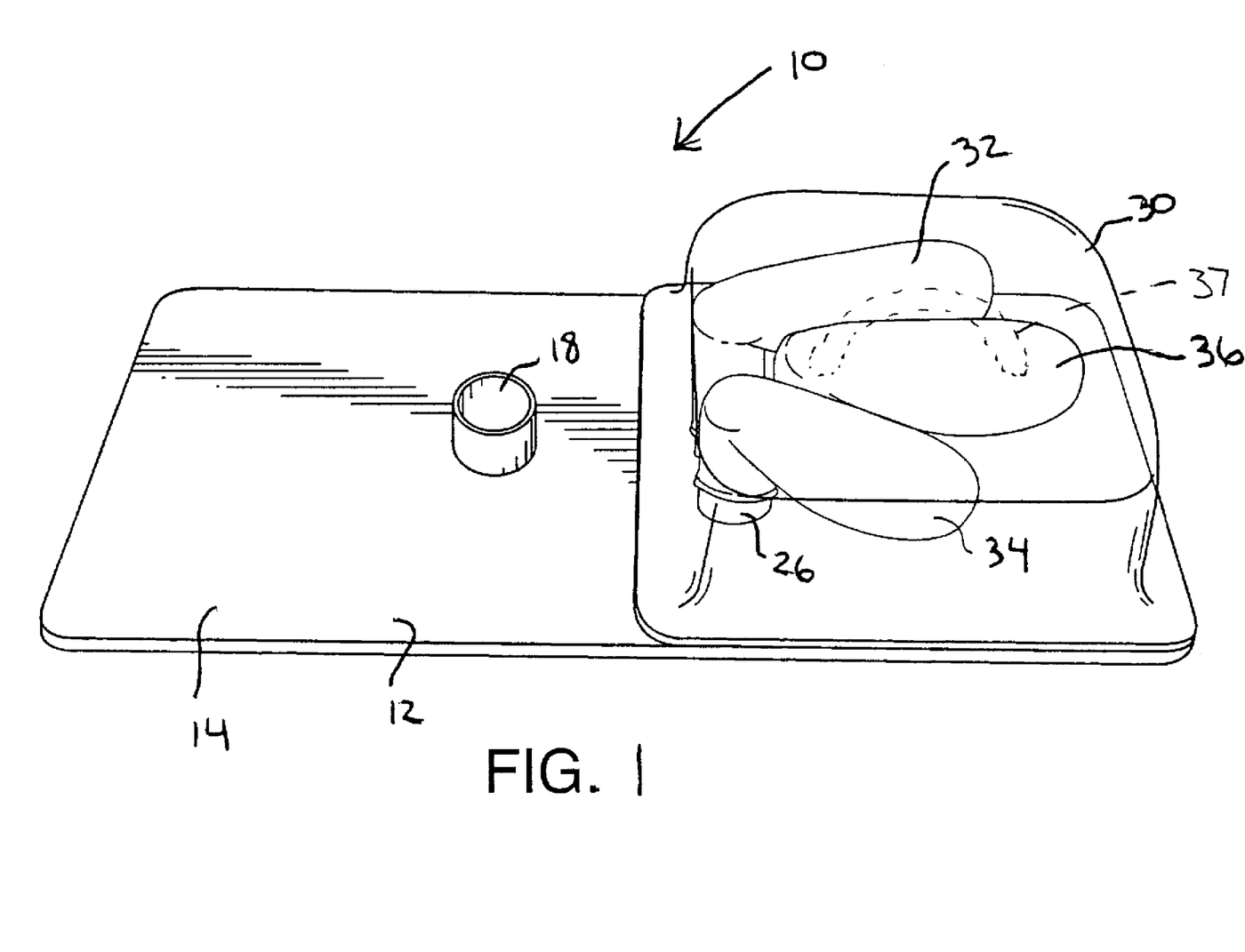
FIG. 1 is a perspective view of one embodiment of a demonstration device according to the invention.
Figure 2:
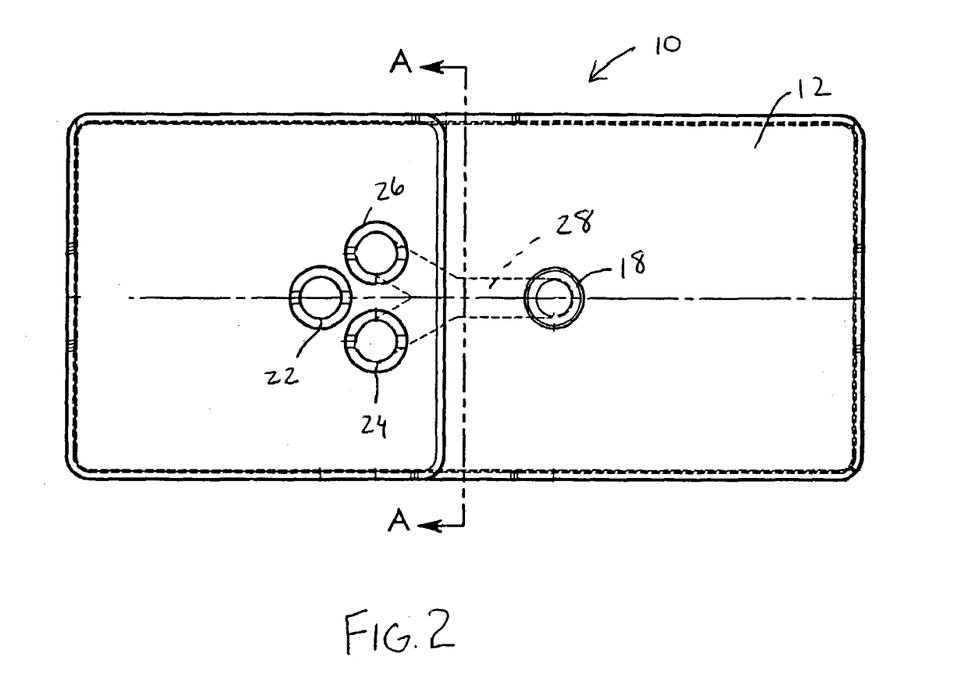
FIG. 2 is a top view of the demonstration device of FIG. 1 with a compression member being removed.
Figure 2A:
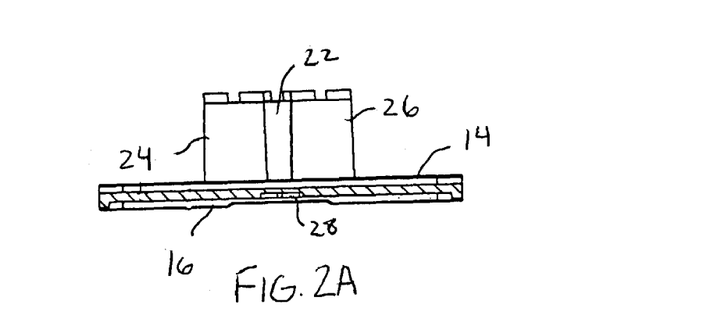
FIG. 2A is a cross sectional end view of the device of FIG. 2 taken along lines A—A.
Figure 2B:
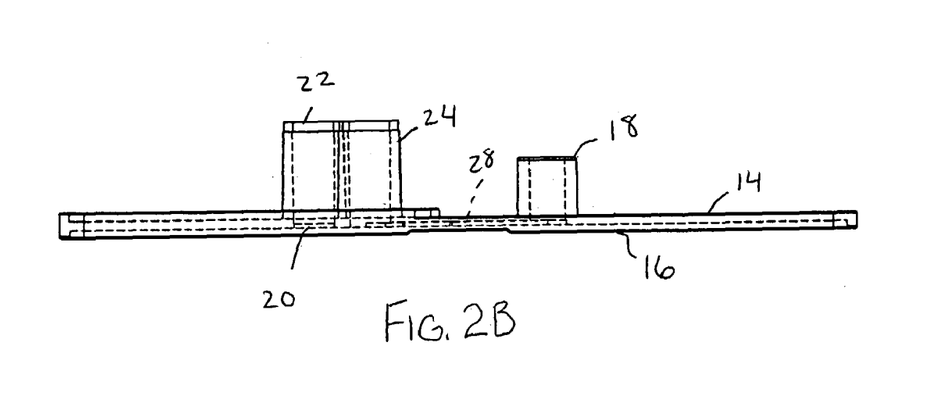
FIG. 2B is a side view of the demonstration device of FIG. 1.

Referring now to FIGS. 1 and 2, one embodiment of a demonstration device 10 will be described. In so doing, it will be appreciated that the invention is not intended to be limited to the specific configuration illustrated in these figures. Device 10 comprises a base 12 having a top 14 and a bottom 16. Formed in base 12 is a respiratory port 18 on top 14 that may be raised to simulate a human trachea. Base 12 also includes a circulation port 20 (see FIG. 2B) on bottom 16 that is aligned with a heart port 22 on top 14. Circulation port 20 and heart port 22 are fluidly connected so that fluids may freely pass between the two ports. Base 12 further includes a pair of lung ports 24 and 26 in top 12. A Y-shaped conduit 28 fluidly connects respiratory port 18 to lung ports 24 and 26. Device 10 also includes a compressible member 30 that is sealed to top 14 of base 12 so as to define a chamber over the lung port 24 and 26 and the heart port 22. Lung members 32 and 34 are disposed over the lung port 24 and 26 and a heart member 36 is disposed over the heart port 22. Conveniently, lung members 32 and 34 and heart member 36 may be constructed of elastomeric balloons. Optionally, these balloons may also be colored. For example, the lung balloons may be colored blue while the heart balloon may be colored red. Also, the human anatomy may be depicted on top 14 so that the user may more easily visualize how the demonstration device relates to a human subject. Optionally, a handle 37 or other lifting mechanism may be coupled to compressible member 30 to permit compressible member 30 to be actively lifted after being compressed. Also, device 10 may be small enough to fit within a user's hand.

The chamber defined by compression member 30 is intended to simulate the chest cavity, while compression member 30 is intended to simulate the chest. As such, compression member 30 may be constructed of a resilient material, such as a clear elastomer that may be pressed downward and then permitted to return to the starting or home position.

In use, device 10 may be used to provide an understanding of the pressures created in the thorax during the administration of CPR alone, or with the use of a valve system 200 (see FIGS. 3–7). To demonstrate the effectiveness of CPR without the valve system 200, the device as illustrated in FIG. 1 is utilized. As shown, device 10 is in the home or rest state where heart member 36 and lung members 32 and 34 are all inflated with air at ambient pressure.

Figure 3:
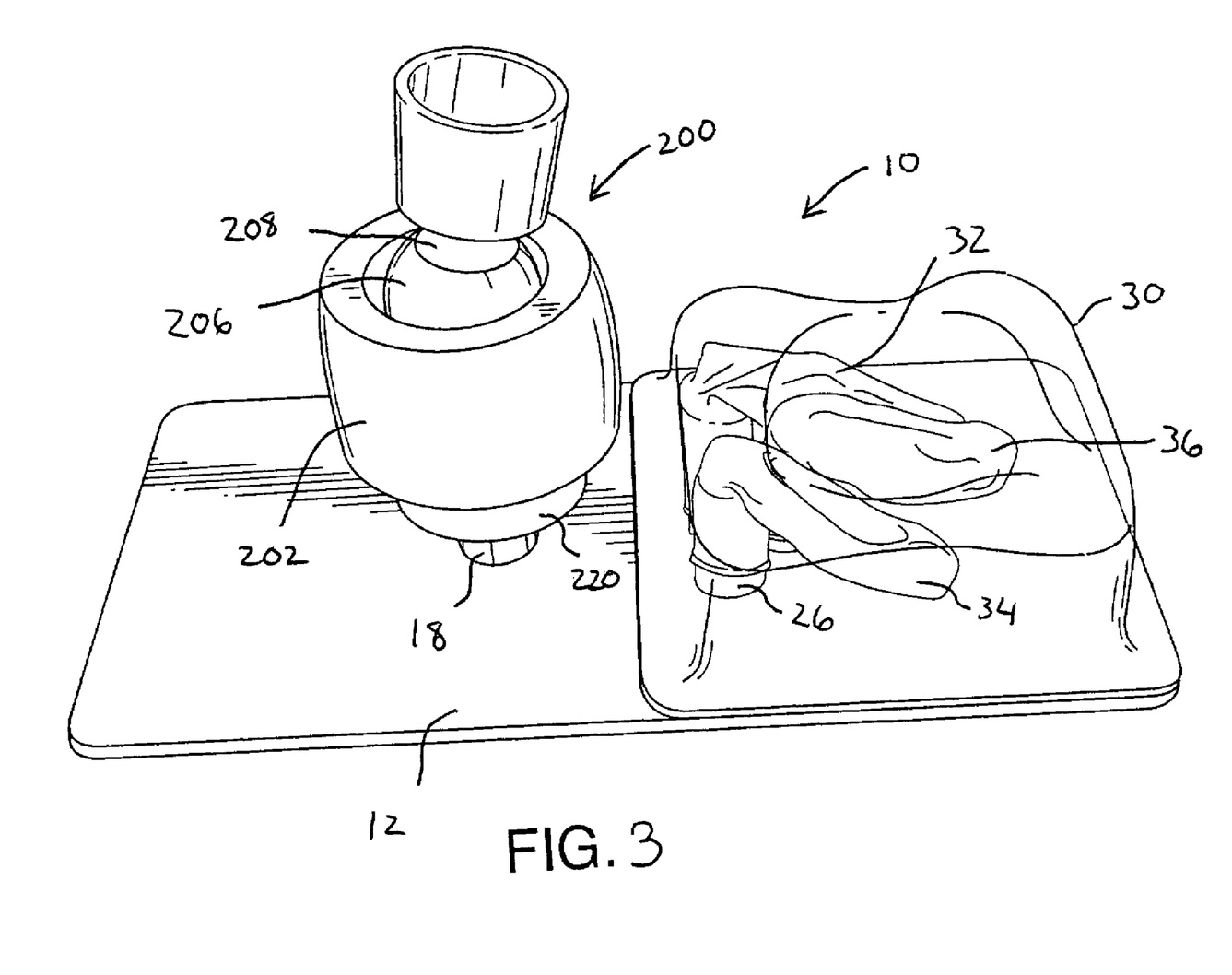
FIG. 3 illustrates the demonstration device of FIG. 1 when the compression member is compressed and when a valve system is coupled to the respiratory port according to the invention.

CPR is performed by pressing one or more fingers down on compression member 30 to simulate the compression of a patient's chest. The state of compression member 30 when compressed in this manner is illustrated in FIG. 3. As shown, heart member 36 and lung members 32 and 34 compress and lose some of their air to simulate blood flow out of the heart to indicate forward blood flow out the chest to the rest of the body, and the expulsion of air from the lungs. The deeper of the compression of the compression member 30, the greater amount of blood flow out of the heart.

The air exiting heart member 36 passes out of circulation port 20, while air from lung members 32 and 34 passes through conduit 28 and out of respiratory port 18. If valve system 200 is not coupled to respiratory port 18, the air is free to exit to the atmosphere. As described hereinafter, when valve system 200 is coupled to respiration port 18, the exiting air is able to pass through valve system 200 and then to the atmosphere. Hence, regardless of whether valve system 200 as attached to respiration port 18, lung members 32 and 34 will compress when compression member 30 is also compressed.

Following compression of compression member 30, the person's finger is lifted to simulate the released pressure on the patient's chest. Compression member 30 is configured to recoil on its own back to the home state as illustrated in FIG. 1. Preferably, the person's finger is rapidly removed from compression member 30 to allow compression member 30 to quickly recoil back to the home position. With valve system 200 detached from respiratory port 18, air returns back into heart member 36 through circulation ports 20 to simulate the flow of blood back into the heart. Further, lung members 32 and 34 inflate with air passing through respiratory port 18 to simulate the return of air into the lungs.

When performing CPR, some rescuers fail to completely remove the pressure applied to the patient's chest to prevent it from completely recoiling. This may be simulated using device 10 by compressing compression member 30 completely with one or more fingers. As previously described, a simulation of blood flow out of the heart and air from the lungs occurs. Instead of completely releasing the chest, a partial release of the chest is simulated by maintaining a slight finger pressure on compression member 30, thereby preventing it from completely recoiling. In so doing, there is a reduction of air back into heart member 36 along with a reduction of ambient air into heart members 32 and 34. This demonstrates that incomplete chest recoil during CPR will have the reduction in blood flow back into the heart and a reduction of ambient air back into the lungs.

Hence, device 10 may be used to illustrate the benefits of both correct and incorrect CPR techniques. If CPR is performed correctly, air is forced from the lungs and blood is forced from the heart with each compression. Further, re-expansion of the lungs with air and the heart with blood occurs with each recoil. Inadequate chest compression reduces blood flow out of the heart to the vital organs. Further, incomplete chest recoil diminishes the negative pressures that are created in the thorax, resulting in a smaller vacuum to draw blood back into the heart. In this way, the amount of blood flow to the vital organs with the next compression is reduced.

Figure 4:
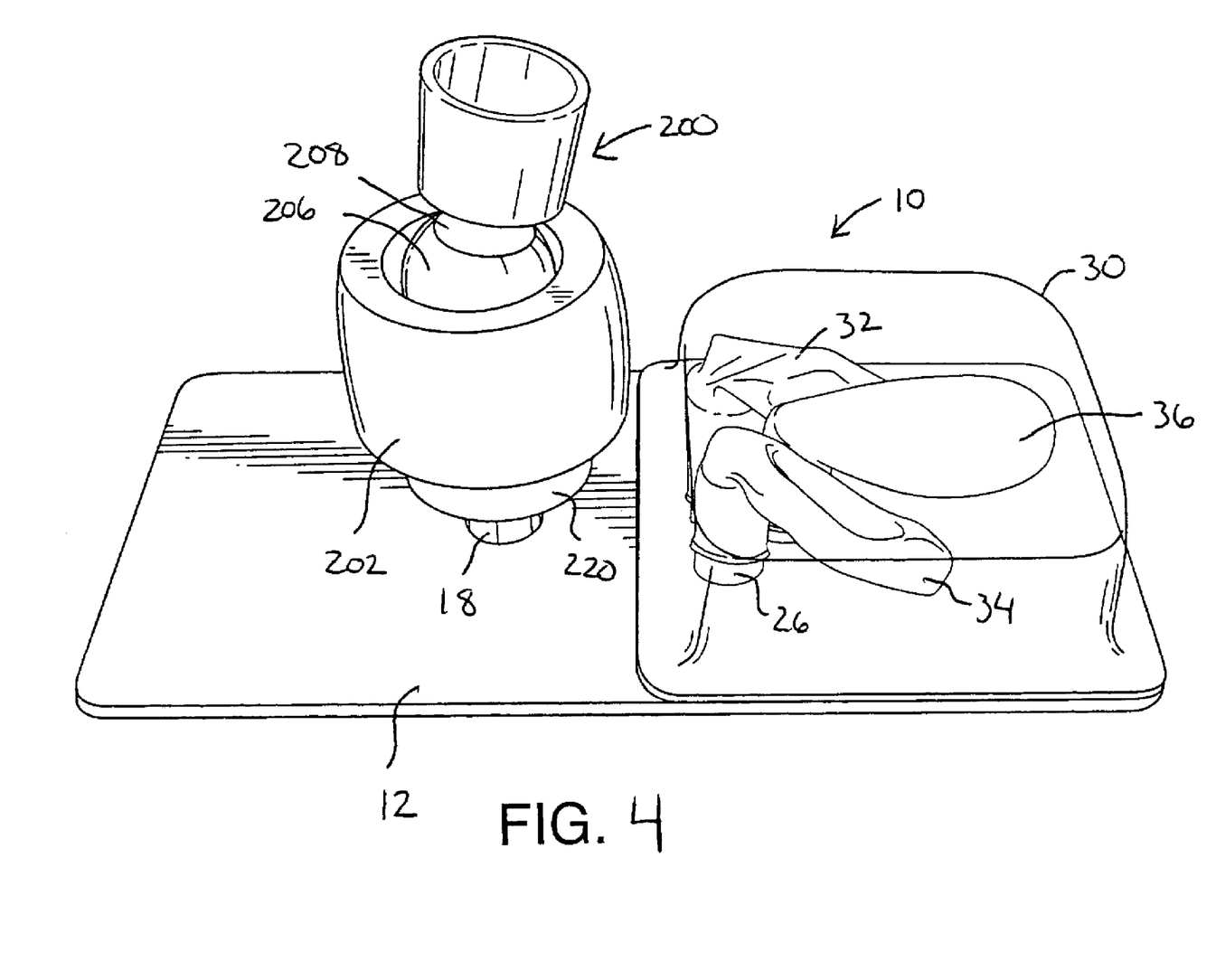
FIG. 4 illustrates the demonstration device of FIG. 3 after the compression member has been released and returns to a home position according to the invention.
Figure 5:
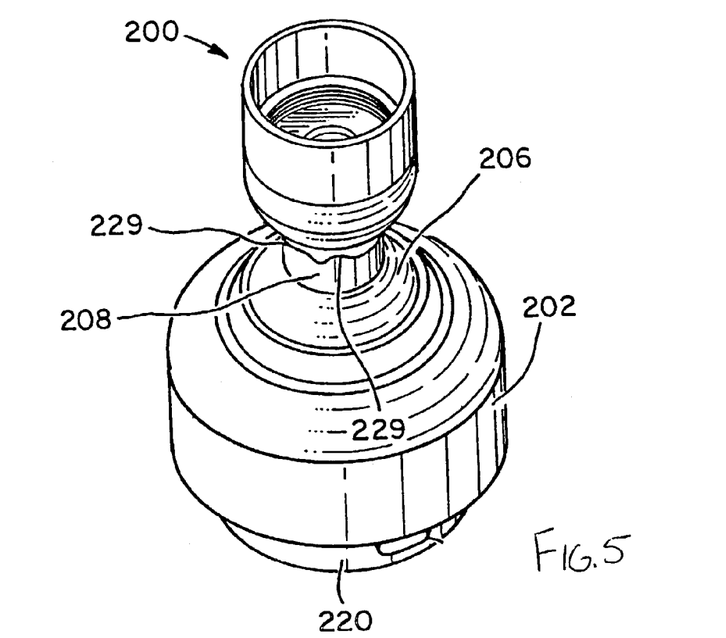
FIG. 5 is a perspective view of the valve system shown in FIG. 3.

To simulate the effectiveness of CPR when valve system 200 is coupled to a patient's airway, valve system 200 may be coupled to respiratory port 18 as illustrated in FIGS. 3 and 4. As shown in FIG. 3, compression member 30 may be compressed with one or more fingers to simulate compression of the chest as previously described. However, when the pressure on compression member 30 is released to allow for a full recoiling of the chest, heart member 36 reinflates significantly faster than when valve system 200 is not coupled to respiratory port 18. This simulates the increased degree and speed of blood flow back into the heart with the use of valve system 200. As such, the patients' heart may be filled faster and with more blood when using valve system 200.

As described in greater detail hereinafter, valve system 200 prevents air from flowing into respiratory port 18 so that the lung members 32 and 34 remain partially deflated. By inhibiting the amount of airflow back into the chamber defined by compression member 30, a greater vacuum is created to draw air in through circulation port 20 and into heart member 36. As such, heart member 36 is filled faster and with more air than when device 10 is used without valve system 200 coupled to respiratory port 18. To provide proper ventilation, the rescuer may inject air into valve system 200 to cause lung members 32 and 34 to inflate, thus simulating how adequate oxygenation may be provided through valve system 200.

Hence, demonstration device 10 may be used to demonstrate that valve system 200 may be used to maximize the negative pressure in the thorax by selectively impeding inspiration during the recoil phase of CPR. This enhanced negative pressure results in a grater vacuum, which pulls more blood back into the chest. Thus, improved venous return increases cardiac output during the subsequent compression phase of CPR, providing greater blood flow to the brain and other vital organs.

Figure 6:
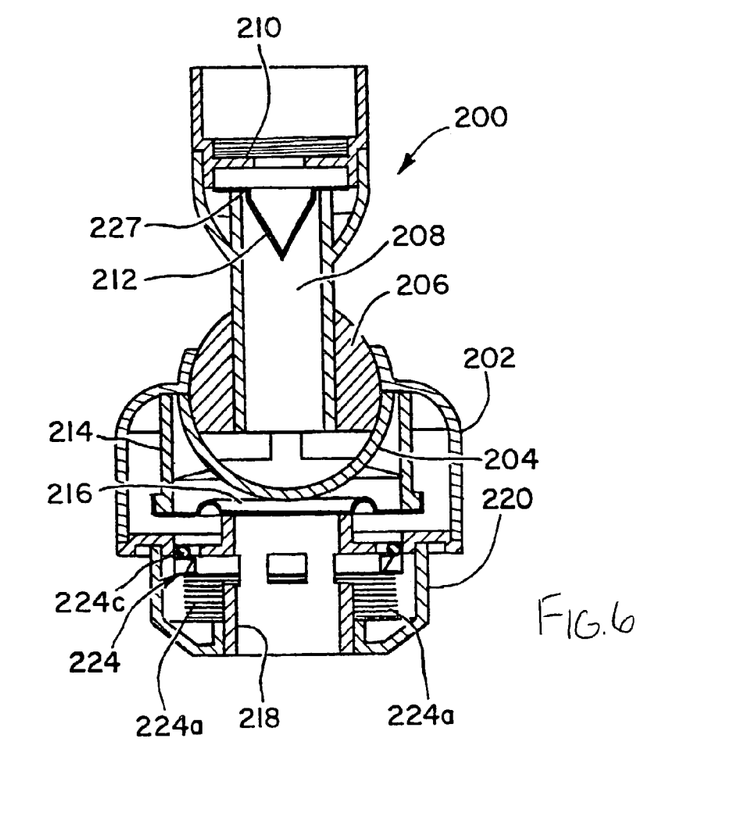
FIG. 6 is a cross sectional view of the valve system of FIG. 5.
Figure 7:
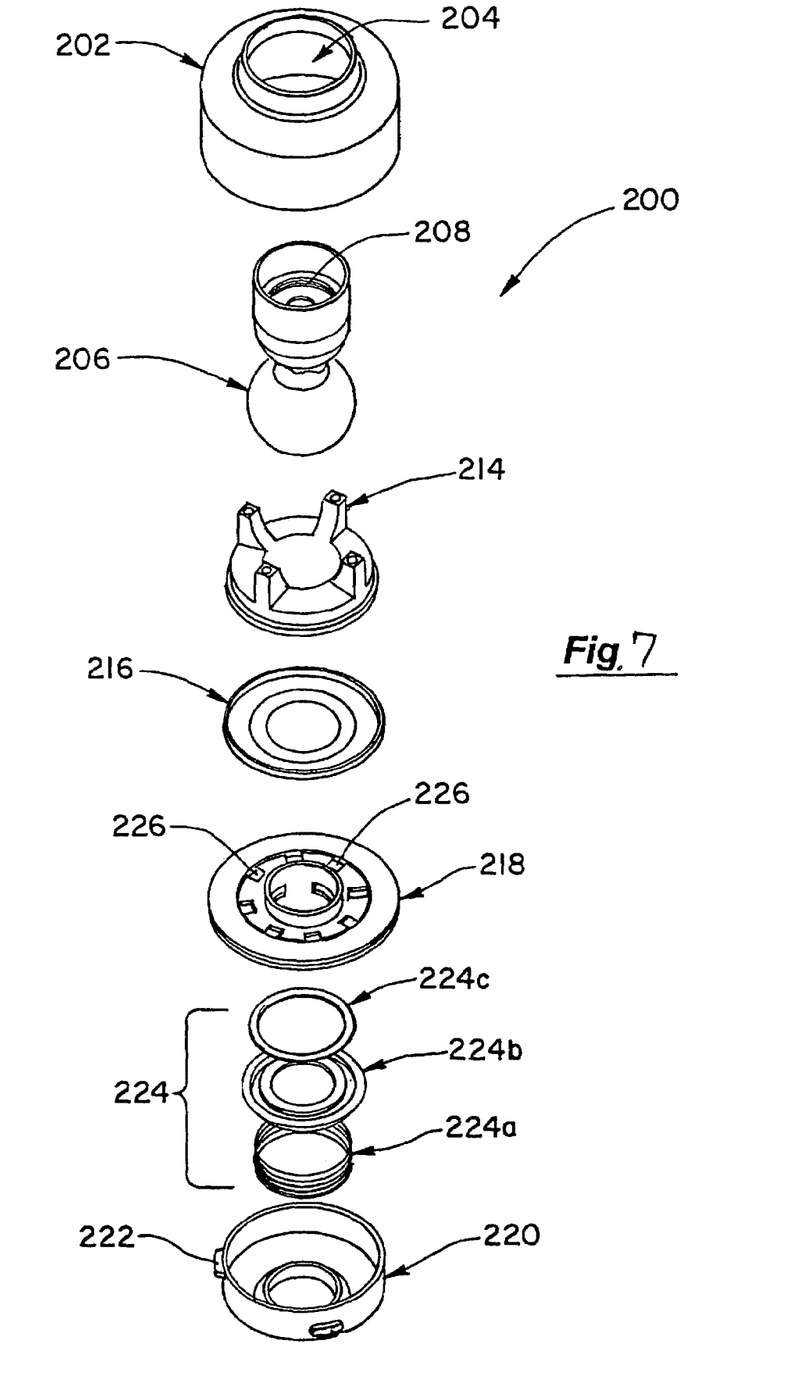
FIG. 7 is an exploded view of the valve system of FIG. 5.

FIGS. 6–8 illustrate the construction and operation of valve system 200 in greater detail. Valve system 200 is similar to the valve system described in U.S. patent application Ser. No. 09/966,945, filed Sep. 28, 2001, previously incorporated by reference. Valve system 200 includes a valve housing 202 with a socket 204 into which a ball 206 of a ventilation tube 208 is received. In this way, ventilation tube 208 may rotate about a horizontal axis and pivot relative to a vertical axis. Ventilation tube 208 may be connected to any type of ventilation system, such as a compressible bag, ventilator, or the like. Disposed in ventilation tube 208 is a filter 210 that is spaced above a duck bill valve 212. A diaphragm holder 214 that holds a diaphragm 216 is held within housing 202. Valve system 200 further includes a patient port 218 that is held in place by a second housing 220. Patient port 218 permits valve system 200 to be coupled to respiratory port 18 with a sliding or a friction fit, although other types of connectors may be used. When used within a patient, port 218 may be coupled to an interface that couples valve system 200 with the patient's respiratory system. Such an interface may comprise a facial mask, and endotracheal tube, a laryngeal mask, or the like.

Also held within housing 220 is a check valve 224 comprising a spring 224a, a ring member 224b and an o-ring 224c. Spring 224a biases o-ring against patient port 218. Patient port 218 includes bypass openings 226 that are covered by o-ring 224c until the pressure in patient port 218 reaches a threshold negative pressure to cause spring 224a to compress.

When active ventilation is provided, respiratory gases are forced through ventilation tube 208. The gases flow through filter 210, through duck bill valve 212, and force up diaphragm 214 to permit the gases to exit through port 218. From there, the gases pass into lung members 32 and 34 to fully inflate them. Hence, at any time during the performance of CPR the lung members may be ventilated simply by forcing the respiratory gases through tube 208.

During the compression phase of CPR when compression member 30 is compressed, lung members 32 and 34 compress, and the expired gases from lung members 32 and 34 flow through port 218 and lift up diaphragm 214. The gases then flow through a passage 227 in ventilation tube 208 where they exit the system through openings 229 (see FIG. 6).

During the recovery or decompression phase of CPR where compression member 30 returns to hits home position (corresponding to when the patient's chest recoils or is actively lifted), valve system 200 prevents respiratory gases from flowing into the lung members 32 and 34 until a threshold of negative intrathoracic pressure level is exceeded. When this pressure level is exceeded, ring member 224b of check valve 224 is pulled downward as spring 224a are compressed to permit respiratory gases to flow through openings 226 and to the lung members by initially passing through tube 208 and duck bill valve 212. In most cases, compression member 30 will be unable to overcome the cracking pressure. Hence, when the compression member 30 returns to its home position, no respiratory gases will be permitted to flow into lung members 32 and 34 through valve system 200. The increased negative pressure in compression member 30 therefore serves to more rapidly inflate heart member 36 (as compared to when respiratory port 18 is unobstructed) to demonstrate the increased circulation that is possible when using valve system 200.

When used with a human patient, valve 224 may be set to open when the negative intrathoracic pressure is in the range from about −5 cm H2O to about −30 cm H2O. These parameters may vary depending on a variety of factors including the condition being treated, patient size, and the like. Once the intrathoracic pressure falls below the threshold, recoil spring 224a again closes check valve 224. In a human patient, such pressures may typically be achieved if the patient spontaneously breathes, or when the patient's chest is actively lifted.

The invention may utilize other valve systems, such as those described in U.S. Pat. Nos. 6,062,219; 5,692,498; 5,551,420; 6,155,257; 6,312,399; 6,463,327; 6,425,393; 6,459,933 and in copending U.S. application Ser. Nos. 10/224,263, filed Aug. 19, 2002, Ser. No. 10/119,203, filed Apr. 8, 2002, Ser. No. 09/854,238, filed May 11, 2001, and Ser. No. 09/546,252, filed Apr. 10, 2000, 09/966,945, filed Sep. 28, 2001, previously incorporated by reference. Further, in some cases, respiratory port 18 may be manually closed, such as with a finger after compression member 30 has been compressed.

The invention has now been described in detail for purposes of clarity and understanding. However, it will be appreciated that certain changes and modifications may be practiced within the scope of the appended claims.

What is claimed is:

1. A demonstration device comprising:
    a base having a front side, a back side, a respiratory port, a circulation port, a heart port and at least one lung port, wherein the heart port is fluidly connected to the circulation port, and wherein the lung port is fluidly connected to the respiratory port;
    a compressible member sealed to the front side of the base so as to define a chamber over the lung port and the heart port;
    a lung member disposed over the lung port; and
    a heart member disposed over the heart port such that when the compressible member is compressed and released, the lung member deflates and inflates and the heart member deflates and inflates.

2. A device as in claim 1, wherein the respiratory port is closable such that when the compressible member is released following a compression, air is prevented from entering into the respiratory port and the lung member remains at least partially deflected while the heart member is permitted to inflate.

3. A device as in claim 1, wherein the circulation port is disposed on the back side of the base.

4. A device as in claim 3, wherein the base includes a frame that permits the circulation port to be spaced apart from a surface upon which the base is configured to rest, and wherein the base is sized to be held in a user's hand.

5. A device as in claim 1, further comprising a pair of lung ports covered by the compressible member such that the heart port is disposed between the two lung ports.

6. A device as in claim 1, wherein the lung member and the heart member each comprise a balloon.

7. A device as in claim 1, wherein the compressible member comprises a flexible plastic dome.

8. A device as in claim 1, further including means for compressing and decompressing the compressible member by pulling upward after each compression.

9. A demonstration system comprising:
a demonstration device comprising:
a base having a front side, a back side, a respiratory port, a circulation port, a heart port and at least one lung port, wherein the heart port is fluidly connected to the circulation port, and wherein the lung port is fluidly connected to the respiratory port;
a compressible member sealed to the front side of the base so as to define a chamber over the lung port and the heart port;
a lung member disposed over the lung port;
a heart member disposed over the heart port such that when the compressible member is compressed and released, the lung member deflates and inflates and the heart member deflates and inflates; and
a valve system comprising a housing having an inlet and an outlet that is capable of being coupled to the respiratory port, wherein the valve system is configured to prevent respiratory gases from entering into the demonstration device through the respiratory port after the compressible member has been compressed and then released.

10. A system as in claim 9, wherein the valve system is configured to permit respiratory gases to exit the respiratory port upon compression of the compressible member.

11. A system as in claim 9, wherein the valve system is configured to permit respiratory gases injected into the inlet to pass into the respiratory port to fill the lung member.

12. A system as in claim 9, wherein the circulation port is disposed on the back side of the base.

13. A system as in claim 12, wherein the base includes a frame that permits the circulation port to be spaced apart from a surface upon which the base is configured to rest.

14. A system as in claim 9, further comprising a pair of lung ports covered by the compressible member such that the heart port is disposed between the two lung ports.

15. A system as in claim 9, wherein the lung member and the heart member each comprise a balloon.

16. A system as in claim 9, wherein the compressible member comprises a flexible plastic dome.

17. A method for demonstration the effectiveness of CPR, the method comprising:
providing a demonstration device comprising
a base having a front side, a back side, a respiratory port, a circulation port, a heart port and at least one lung port, wherein the heart port is fluidly connected to the circulation port, and wherein the lung port is fluidly connected to the respiratory port;
a compressible member sealed to the front side of the base so as to define a chamber over the lung port and the heart port;
a lung member disposed over the lung port;
a heart member disposed over the heart port such that when the compressible member is compressed and released, the lung member deflates and inflates and the heart member deflates and inflates; and
compressing the compressible member to force air out of the lung member where it escapes through the respiratory port and to force air out of the heart member where it escapes through the circulation port.

18. A method as in claim 17, further comprising closing the respiratory port after compressing the compressible member, and releasing the compressible member to permit air to flow back into the heart member through the circulation port while preventing air from entering into the lung member through the respiratory port.

19. A method as in claim 17, further comprising closing the respiratory port after compressing the compressible member, and pulling up on the compressible member to draw air back into the heart member through the circulation port while preventing air from entering into the lung member through the respiratory port.

20. A method as in claim 18, further comprising coupling a valve system to the respiratory port to prevent air from entering into the lung member after releasing the compressible member.

21. A method as in claim 20, further comprising re-compressing the compressible member while the valve system is coupled to the respiratory port and permitting air from the lung member to exit the device through the valve system.

22. A method as in claim 20, further comprising injecting air through the valve system and into the lung member to inflate the lung member.

* * * * *